(12) United States Patent
Akamine

(10) Patent No.: US 7,980,823 B2
(45) Date of Patent: Jul. 19, 2011

(54) WIND TURBINE GENERATOR ROTOR, WIND TURBINE GENERATOR AND WIND TURBINE GENERATOR SYSTEM

(76) Inventor: Tatumi Akamine, Tokyo (JP)

( * ) Notice: Subject to any disclaimer, the term of this patent is extended or adjusted under 35 U.S.C. 154(b) by 477 days.

(21) Appl. No.: 12/290,192

(22) Filed: Oct. 27, 2008

(65) Prior Publication Data

US 2009/0167028 A1  Jul. 2, 2009

Related U.S. Application Data

(63) Continuation-in-part of application No. PCT/JP2007/059417, filed on Apr. 25, 2007.

(30) Foreign Application Priority Data

Apr. 25, 2006 (JP) ................................ 2006-145911
Feb. 1, 2007 (JP) ................................ 2007-052025

(51) Int. Cl.
*F03D 3/00* (2006.01)
(52) U.S. Cl. ........................................ 416/131; 290/55
(58) Field of Classification Search .................. 416/131, 416/132 A, 132 B; 290/55
See application file for complete search history.

(56) References Cited

U.S. PATENT DOCUMENTS

| 802,144 | A | * | 10/1905 | Harrington | ...................... 416/41 |
| 2,677,344 | A | * | 5/1954 | Annis | .............................. 440/31 |
| 3,212,470 | A | * | 10/1965 | Wiggin | ............................. 440/8 |
| 4,191,507 | A | * | 3/1980 | DeBerg | ......................... 416/117 |
| 4,419,587 | A | * | 12/1983 | Benton | ........................... 290/44 |
| 4,681,512 | A | * | 7/1987 | Barnard | ..................... 416/132 B |
| 4,718,822 | A | * | 1/1988 | Riezinstein | .................... 416/119 |
| 5,642,983 | A | * | 7/1997 | Chung | ........................... 416/119 |
| 6,283,710 | B1 | * | 9/2001 | Biscomb | .................. 416/132 B |
| 2008/0258468 | A1 | * | 10/2008 | Fuller | ............................. 290/55 |
| 2008/0267777 | A1 | * | 10/2008 | Lux | ............................ 416/132 B |
| 2010/0167602 | A1 | * | 7/2010 | Vu | .................................... 440/6 |
| 2010/0295316 | A1 | * | 11/2010 | Grassman | ....................... 290/55 |

FOREIGN PATENT DOCUMENTS

| EP | 2014914 A1 | * | 1/2009 |
| JP | 06017745 A | * | 1/1994 |
| JP | 2003-120502 | | 4/2003 |
| JP | 2004-27845 | | 1/2004 |
| JP | 2004-353637 | | 12/2004 |
| JP | 2005-9415 | | 1/2005 |
| JP | 2005-320865 | | 11/2005 |

* cited by examiner

*Primary Examiner* — Joseph Waks
(74) *Attorney, Agent, or Firm* — Jordan and Hamburg LLP

(57) ABSTRACT

Provided is a wind power generating apparatus adopts a rotor blade including a frame body unit composed of a frame body having an opening and a plurality of support frames extending from the frame body, and a sail portion adhered to cover the frame body unit. The frame body unit is configured to be retractable using wires and a servo-motor to decrease the surface area of the rotor blade in high winds. As a result, the rotor blade can rotate easily with a low wind power and can rotate continuously with an inertial power, once it starts the rotations, so that it can run the power generating function at a set value of a rated speed of rotations of 700 to 2,000 rpm.

13 Claims, 7 Drawing Sheets

WIND TURBINE GENERATOR ROTOR, WIND TURBINE GENERATOR AND WIND TURBINE GENERATOR SYSTEM

BACKGROUND OF THE INVENTION

1. Technical Field

The present invention relates to a wind turbine generator, more specifically, a wind turbine generator that includes a support column and a rotor with multiple canvas blades attached to the support column, the support column detachably fixed to an inner part of a circular ring and provided with tapered end portions, and that can be rotated by even weak wind force and can also be rotated continuously by inertial force after the rotation.

2. Background Art

In conventional wind power generation, propeller wind turbines and Darrieus wind turbines are the mainstreams of the horizontal axis wind turbines and the vertical axis wind turbines, respectively. However, it is said that these types of wind turbines can only deliver their performance with a wind speed of 10 m/s or faster.

Especially in wind power generation using propeller wind turbines, it has been inevitable that the entire wind turbine results in being large in size due to the following reason. A small wind turbine of this type rotates at 40 to 100 rpm. However, to use such a small wind turbine as a commercial wind turbine, the rated speed needs to be 900 to 1,750 rpm. Accordingly, the wind turbine has to be equipped with a speed-increasing gear that is used to increase the rated speed 20 to 60 times.

In addition, a disc or a brake is used for the control in strong winds to force the wind turbine to stop rotating, and this in turn causes an increase in price of the entire wind turbine. To improve these situations, a small and inexpensive wind turbine that is capable of increasing the rated speed by using a gear even when the wind force is weak has been developed (Japanese Patent Application Publication No. 2005-320865).

In contrast, Savonius wind turbines, paddle wind turbines and rotating-blade wind turbines are examples of wind turbines capable of generating power by weak winds. Such wind turbines are drag type wind turbines, and operate efficiently when the tip speed ratio (the peripheral speed of rotor/wind speed) is small while having a disadvantage of decreasing in operating performance when the tip speed ratio is large.

As a wind turbine for addressing these disadvantages, Japanese Patent Application Publication No. 2004-353637 discloses a "rotating-blade vertical axis wind turbine." This rotating-blade wind turbine "includes canvas blades in a vertically-long shape, satisfying width:length=1:3 or larger, and each having a width 1.2 times or more longer than the length of the canvas blade frame to form a sag, and puts the power generator into operation by receiving wind force with lift force+drag force, causing sails having a high wind-receiving efficiency to rotate, and then causing a pinion for the power generator to rotate by the working of a rotation transmission gear."

Japanese Patent Application Publication No. 2005-9415 discloses a "mechanism for automatically adjusting rotations of wind turbine." In this mechanism, "canvas blades made of flexible and strong canvas are provided, yard members are attached respectively to the front ends and the back ends of the canvas blades, the front yard members are attached to a doughnut-shaped front hub member, the back yard members are attached to a doughnut-shaped back hub member to form a radial pattern, a rotation shaft is inserted into the hub members so as to protrude from the hub members, speed control balancers are attached to the back hub member with the rotation shaft interposed between the speed control balancers, connecting rods parallel with the rotation shaft are connected to a slide cylinder integrated with the front hub member, a spring bearing is provided to the front end of the rotation shaft, a return spring is elastically provided between the slide cylinder and the spring bearing, a long spiral hole is formed in the slide cylinder, a lock pin implanted in the rotation shaft in a standing position is loosely fitted into the long spiral hole, and torque of the rotation shaft is transmitted to the power generator."

Patent Document 1 Japanese Patent Application Publication No. 2005-320865

Patent Document 2 Japanese Patent Application Publication No. 2004-353637

Patent Document 3 Japanese Patent Application Publication No. 2005-9415

SUMMARY OF THE INVENTION

Recently, a lot of propeller wind turbines have been constructed in regions with strong winds. However, wind turbines of this type have the following disadvantages. A propeller wind turbine has a restriction that a support column for supporting the propeller needs to be strengthened rather than the propeller itself, which leads to an increase in construction cost. Moreover, since propeller wind turbines are constructed in a large site, they are more likely to be hit by lighting.

Furthermore, propeller wind turbines make large wind noise since the blades constituting the propeller are made of metal or hard plastic. In addition, when the blades are hit by a gust of strong wind, they might break into pieces, and the scattered pieces might hurt humans and animals. Hence, there is also a location problem that propeller wind turbines need to be constructed in a large and remote site.

Moreover, a starting motor is an essential for propeller wind turbines because of the following restriction. To cause the propeller to rotate at startup or in light winds, a separately-provided motor needs to be put into operation first to cause the propeller to rotate and to activate the power generation function in the meanwhile.

On the other hand, in the above-described case of using canvas blades made of canvas, unlike the case of using blades made of metal or hard plastic, the blades do not brake into pieces which prevent the pieces to be scattered. However, disadvantageously, such blades might not rotate depending on the wind direction.

The inventors of the present invention diligently carried out research to solve the above-described problems. Through the research, the inventors succeeded in developing a new wind turbine generator having the following features and a wind turbine generator system using the wind turbine generator. In this wind turbine generator, a rotor can easily start rotating by small wind force (1 to 2 m/s or more) by using bowl-shaped rotor blades made of canvas, and once the rotor starts rotating, it can continuously rotate because of the inertia force. Moreover, this wind turbine generator is inexpensive and can be constructed in a site having no power source.

Specifically, a wind turbine generator rotor unit according to an embodiment of the present invention comprises: a support column being a rod having an upper end portion and a lower end portion each reduced in external diameter toward the tip of the end portion; a circular ring holding the end portions of the support column so that the support column itself rotates; a holder fixed to the support column; and a plurality of rotor blades attached to the support column by using the holder. Here, the wind turbine generator rotor unit is wherein the rotor blades each include: a frame unit including a frame having an opening, multiple first support frames each extending from the frame so as to form semielliptical shape, and a central support frame supporting the first support frames; and a sail attached to the frame unit so as to cover the frame unit.

In a wind turbine generator rotor unit according to a further embodiment, the holder is a circular plate fixed to a central portion of the support column, and the rotor blades are each attached to the holder by sandwiching the holder.

According to a wind turbine generator rotor unit according to another embodiment, the holder is a circular fixing member holding and fixing peripheries of the rotor blades.

In a wind turbine generator rotor unit according to a further embodiment, fixing member main bodies are provided respectively on upper and lower central portions of an inner surface of the circular ring, and the end portions of the support column are fitted respectively to the insides of the fixing member main bodies by using adjustors which enable height adjustment.

In yet another embodiment, in a wind turbine generator rotor unit, the rotor blades have a structure making the rotor blades foldable frontward and backward.

A wind turbine generator may also comprise at least: the wind turbine generator rotor unit mentioned above; a power generator generating power by using torque of the wind turbine generator rotor unit; and a transmission mechanism transmitting torque of the support column of the wind turbine generator rotor unit to the power generator.

The wind turbine generator may also further comprise a power storage storing power generated by the aforementioned power generator.

The powers storage of the wind turbine generator is advantageously formed of any one of a secondary battery and/or an electric double-layer capacitor.

In a wind turbine generator according to a further embodiment, the support column, serving as a rotation shaft of the wind turbine generator rotor unit, is provided with a plurality of longitudinal rails, and wires provided to end portions of each of the rotor blades are moved by a servomotor provided to one of the end portions of the support column, so that the frames are folded.

A wind turbine generator according to a further embodiment comprises: a rotor unit including a circular suspension member having an opening in the bottom, a plurality of rotor blades suspended from the suspension member, and a circular holder holding one end portion of each of the rotor blades; a plurality of support rods supporting the suspension member; a power generator generating power by using torque of the circular holder; and a power storage storing power generated by the power generator.

The wind turbine generator according advantageously further comprises a rotation stopper forcing the rotor unit to stop rotating.

Another embodiment of a wind turbine generator system according to the invention comprises: the wind turbine generator as mentioned above; and a power control unit transmitting power generated in the wind turbine generator to a power system of a building. Here, the wind turbine generator supplies power generated by the power generator to the power storage through a rectifier, or directly from the power generator, and the power control unit includes a power convertor which converts power from the power storage into power having a voltage, a frequency and the like conforming with power system standards, and which has necessary protection functions.

A first aspect of the present invention provides a wind turbine generator rotor blade comprising: a frame unit including a frame having an opening and a plurality of support frames each extending from the frame; and a sail attached to the frame unit so as to cover the frame unit.

A second aspect of the present invention provides the wind turbine generator rotor blade, wherein the opening is in any one of a semicircular shape, a semielliptical shape, a leaf shape, or a comb shape.

A third aspect of the present invention provides the wind turbine generator rotor blade, wherein the support frames include a plurality of first support frames each extending from the frame and a central support frame supporting the first support frames.

A fourth aspect of the present invention provides the wind turbine generator rotor blade, wherein the first support frames each extend from the frame so as to form a semielliptical shape.

A fifth aspect of the present invention provides the wind turbine generator rotor blade, wherein a hole is formed in an end portion of the sail, and a string is inserted into the hole to attach the sail to the frame unit so as to cover the frame unit.

A sixth aspect of the present invention provides the wind turbine generator rotor blade, wherein the rotor blade is overall in a bowl shape expanding outwardly with a radius.

A seventh aspect of the present invention provides the wind turbine generator rotor blade, wherein the frame of the rotor blade has a structure allowing the frame to be folded frontward and backward.

An eighth aspect of the present invention provides a wind turbine generator comprising: a rotor unit including a support column, a holder fixed to the support column, and a plurality of rotor blades attached to the holder; a circular ring detachably holding end portions of the support column; and a power generator coupled to the rotor unit with a transmission mechanism interposed therebetween, and generating power by using torque of the rotor unit.

A ninth aspect of the present invention provides the wind turbine generator, further comprising a power generating unit storing power generated by the power generator.

A tenth aspect of the present invention provides the wind turbine generator, wherein the rotor unit further includes a circular fixing member having, in an inner circumferential surface, a recess for holding and fixing outer frames of the rotor blades.

An eleventh aspect of the present invention provides the wind turbine generator, wherein the circular fixing member is formed of hard resin.

A twelfth aspect of the present invention provides the wind turbine generator, wherein the holder is a flywheel fixed to a central portion of the support column.

A thirteenth aspect of the present invention provides the wind turbine generator, wherein the support column is a rod having an upper end portion and a lower end portion each reduced in external diameter toward the tip of the end portion.

A fourteenth aspect of the present invention provides a wind turbine generator, wherein the support column is an aluminum rod.

A fifteenth aspect of the present invention provides the wind turbine generator, wherein fixing member main bodies are provided respectively on upper and lower central portions of an inner surface of the circular ring, a fixing member is provided in an inside of each of the fixing member main bodies, and the end portions of the support column are inserted respectively into the fixing members having a plurality of bearings, each of the fixing members provided in an inside of the corresponding fixing member main body with an adjustor for height adjustment interposed in between.

A sixteenth aspect of the present invention provides the wind turbine generator, wherein the circular ring is formed of a thin stainless plate with a width of 10 cm.

A seventeenth aspect of the present invention provides the wind turbine generator, wherein springs are attached to the adjustors, respectively.

An eighteenth aspect of the present invention provides the wind turbine generator, wherein the transmission mechanism is provided around the lower end portion of the support column, and torque of the support column is thereby transmitted to the power generator through the transmission mechanism.

A nineteenth aspect of the present invention provides the wind turbine generator, wherein the transmission mechanism includes any one of a combination of a torque pulley and a transmission belt and a combination of gear wheels meshing with each other.

A twentieth aspect of the present invention provides the wind turbine generator, wherein the flywheel is a circular plate and is fixed to a substantially central portion of the support column by upper and lower fasteners.

A twenty-first aspect of the present invention provides the wind turbine generator, wherein the upper and lower fasteners are: an upper fastener fixing the flywheel to the support column by inserting a rectangular pin into a shallow groove perpendicularly formed in the support column and a groove formed in a position of the flywheel, the position facing the groove in the support column; and a lower fastener including a bearer fixed to the support column by welding.

A twenty-second aspect of the present invention provides the wind turbine generator, wherein the rotation shaft is provided with a plurality of longitudinal rails, and wires provided to end portions of each of the rotor blades are moved by a servomotor provided to one of the end portions of the rotation shaft, so that the rotor blades are folded.

A twenty-third aspect of the present invention provides a wind turbine generator system comprising a power control unit transmitting power generated in the wind turbine generator to a power system of a building. Here, the wind turbine generator system wherein the wind turbine generator supplies power generated by the power generator to the power storage through a rectifier, or directly from the power generator, and the power control unit includes a power convertor which converts power from the power storage into power having a voltage, a frequency and the like conforming with power system standards, and which has necessary protection functions.

A twenty-fourth aspect of the present invention provides the wind turbine generator system, wherein the power storage is formed of any one of a secondary battery and an electric double-layer capacitor.

A twenty-fifth aspect of the present invention provides a wind turbine generator comprising: a rotor unit including a circular suspension member having an opening in the bottom, and a circular holder holding one end portion of each of a plurality of rotor blades suspended from the suspension member; a plurality of support rods supporting the suspension member; a rotation stopper forcing the rotor unit to stop rotating; a power generator generating power by using torque of the circular holder; and a power storage storing power generated by the power generator.

A twenty-sixth aspect of the present invention provides the wind turbine generator, wherein the circular suspension member has an opening in the bottom, and the opening is in a substantially circular shape, which allows the spherical rotor blades to rotate.

A twenty-seventh aspect of the present invention provides the wind turbine generator, wherein the power generator is coupled with a pinion for the power generator, so that when the pinion for the power generator is rotated by torque of the circular holder, a rotor of the power generator coupled with the pinion is rotated to generate power.

A twenty-eighth aspect of the present invention provides the wind turbine generator, wherein the rotation stopper includes a pair of sandwiching members, and has a structure allowing the rotation stopper to sandwich the circular holder from both sides.

DESCRIPTION OF REFERENCE NUMERALS

Figure 1:
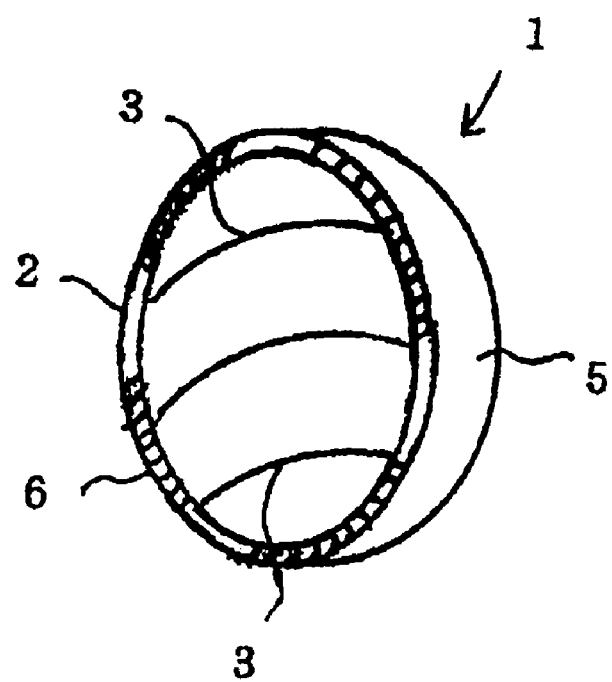
FIG. 1 is a perspective view of a rotor blade for a wind turbine generator according to the present invention.

1 . . . rotor blade
1a . . . end portion
1a . . . end portion
2 . . . frame
3 . . . (first) support frame
4 . . . central support frame
5 . . . sail
6 . . . string
7 . . . support column
8 . . . flywheel
9 . . . circular ring
10 . . . frame unit
12 . . . power generator
13 . . . power storage
14 . . . upper fastener (wedge-shaped pin)
15 . . . lower fastener (bearer)
16 . . . groove
17 . . . fixing member main body
18 . . . bearing
19 . . . fixing member
20 . . . adjustor
21 . . . fastener
22 . . . circular fixing member (holder)
23 . . . recess
24 . . . rotating pulley 25 . . . transmission belt
26 . . . circular suspension member
27 . . . support bar
28 . . . rotor blade
29 . . . circular holder
30 . . . rotation stopper
31 . . . power generator
32 . . . power storage
33 . . . pinion for power generator
34 . . . lighting conductor
35 . . . mount
40 . . . power control unit
50 . . . slot
60 . . . anemometer
61 . . . servomotor
62 . . . wire
63 . . . housing
64 . . . shaft stopper ring
65 . . . base
66 . . . V-belt pulley
67 . . . small pulley
100, 200, 300 . . . rotor unit

DETAILED DESCRIPTION OF THE INVENTION

Detailed description will be given below of the present invention on the basis of the drawings. However, the scope of the present invention is not limited to the description.

Figure 2:
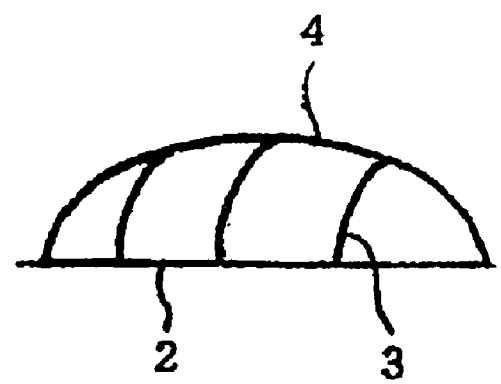
FIG. 2 is an explanatory view showing a configuration of a frame unit in FIG. 1.
Figure 3A:
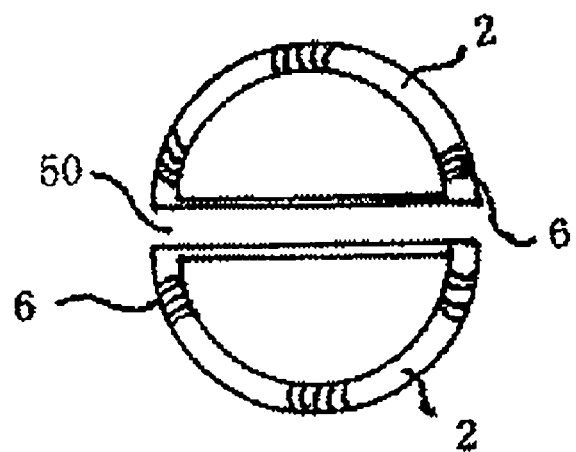
FIG. 3 is explanatory views showing variations of a frame.
Figure 3B:
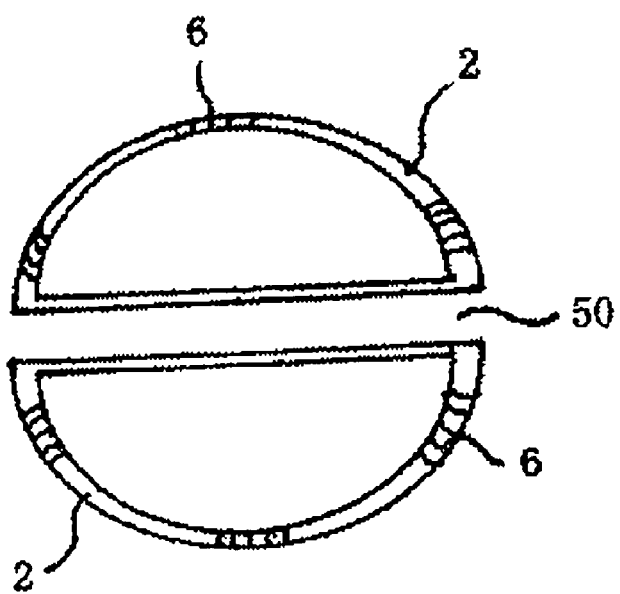

FIG. 1 shows a basic shape of a rotor blade 1 used in a wind turbine generator of the present invention, and FIG. 2 is an illustration showing a structure of a frame unit shown in FIG. 1. FIG. 3 is illustrations showing variations of a frame 2, and shapes for allowing a flywheel 8 to be sandwiched and fitted to a slot 50 (as shown in FIG. 7 or FIG. 8) are shown in FIGS. 3a and 3b, respectively.

The rotor blade 1 includes a frame unit 10. As shown in FIG. 1 and FIG. 2, the frame unit 10 includes: the frame 2 having openings in a semicircular shape or a semielliptical shape, or a different shape such as a leaf shape or a comb shape; multiple first support frames 3 each provided in an extending manner from the frame 2 so as to form a semielliptical shape; and a central support frame 4 supporting the first support frames 3. The rotor blade 1 is fixed to a support column 7 with a holder 8 interposed therebetween, in such a manner that a string 6 is inserted to holes (not shown) formed in a peripheral portion of a sail 5 attached to the frame unit 10 so as to cover the frame unit 10, and is thus overall in a bowl shape expanding outwardly with a radius.

Figure 8:
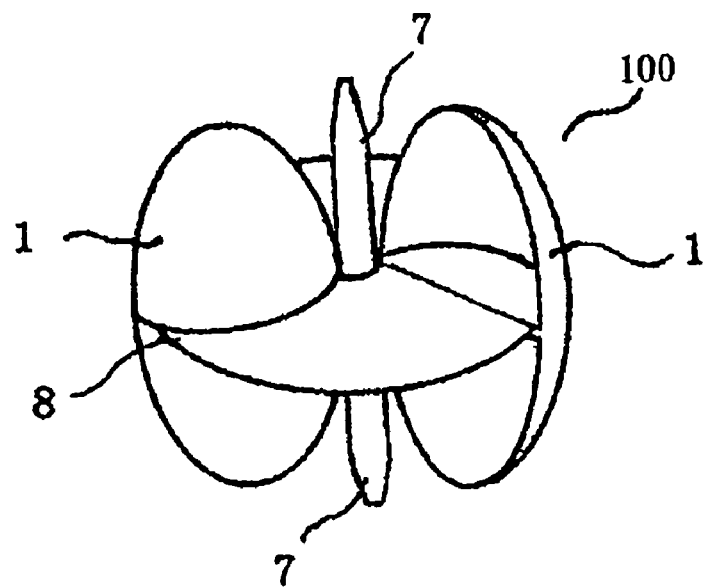
FIG. 8 is a perspective view of a rotor according to the present invention.
Figure 9:
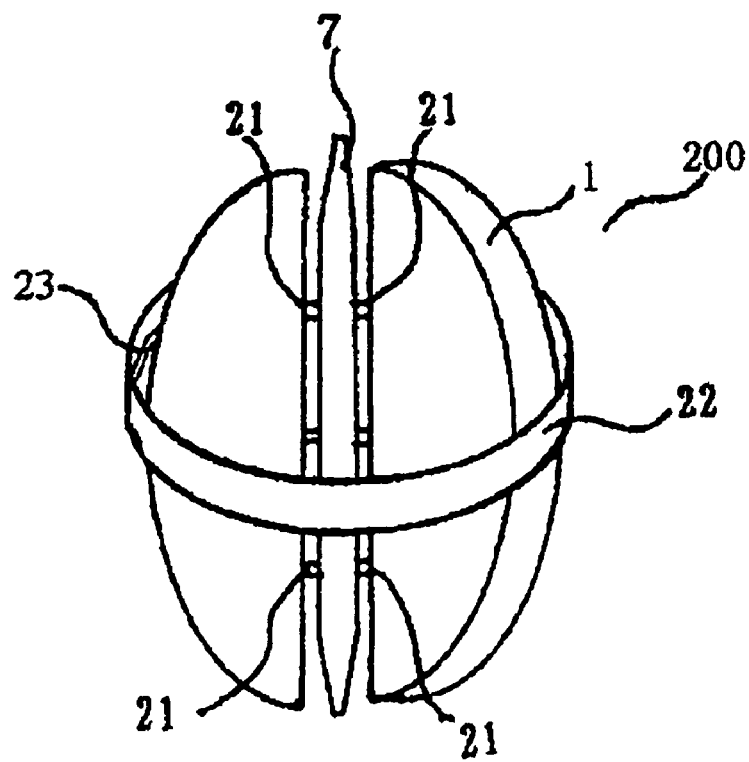
FIG. 9 is a perspective view of another rotor according to the present invention.

As the holder, either the flywheel 8 partitioning the rotor blades as shown in FIG. 8 and FIG. 9 or fasteners 21 directly attached to the support column are used.

Figure 4:
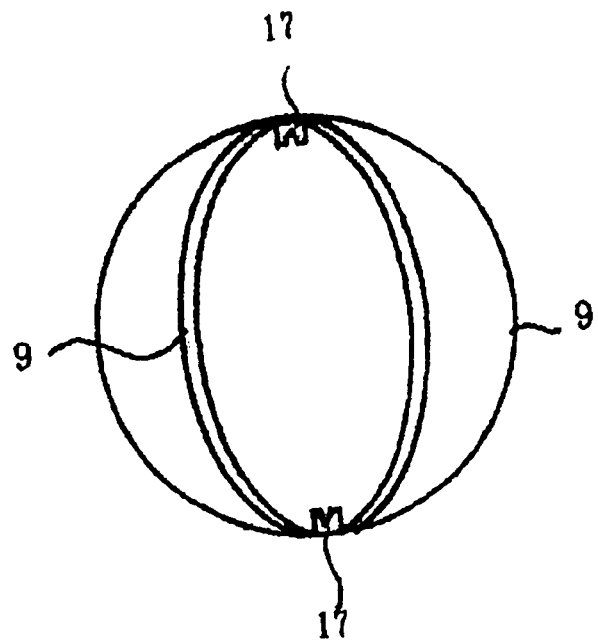
FIG. 4 is a perspective view of an external view of a circular ring according to the present invention.
Figure 7:
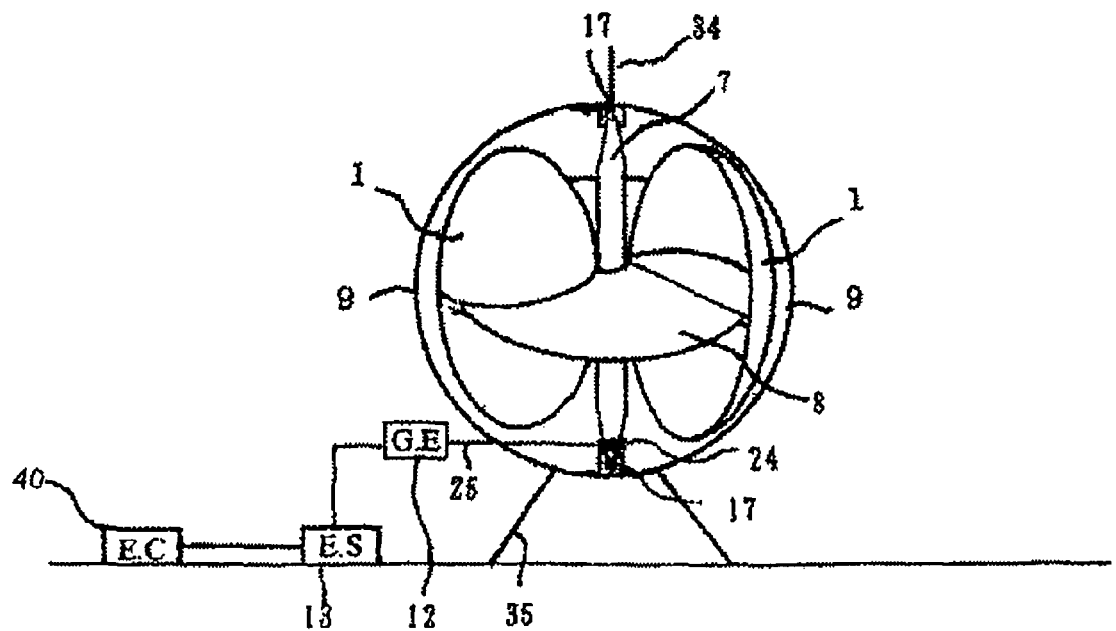
FIG. 7 is an explanatory view for explaining a wind turbine generator system according to the present invention.

As shown in FIG. 7, the wind turbine generator of the present invention includes a rotor unit 100, a power generator 12 generating power by using torque of the rotor unit 100, and a power storage 13 storing power generated by the power generator 12, in a circular ring 9 detachably holding the end portions of the support column 7 as shown in FIG. 4. The rotor unit 100 includes the support column 7, the flywheel 8 fixed to a central portion of the support column 7, and multiple rotor blades 1 attached to a circular disc of the flywheel 8.

An example of the wind turbine generator of the present invention includes, as shown in FIG. 7: the rotor unit 100 consisting of the circular ring 9 formed of a thin stainless plate with a width of 10 cm and holding the end portions of the support column 7, the support column 7 made of metal and detachably attached to the inside of the circular ring 9, the flywheel 8 made of metal and fixed to the central portion of the support column 7, and the multiple rotor blades 1 attached to the flywheel 8; the power generator 12 generating power by using torque of the rotor unit 100; and the power storage 13 storing power generated by the power generator 12.

The support column 7 of the wind turbine generator of the present invention is a rod with the external diameter of each of the upper end portion and the lower end portion reduced toward the tip of the end portion. Accordingly, once this support column 7 starts rotating by the turning action of the rotor blades 1 attached to the flywheel 8, the rotation continues for a long time because of the inertial force as the rotation of a commercially-available gyro-top. This is because as the finer the end portions are formed, the less the resistance in the event of rotation becomes, which allows the rotation to continue for a long time.

Figure 5:
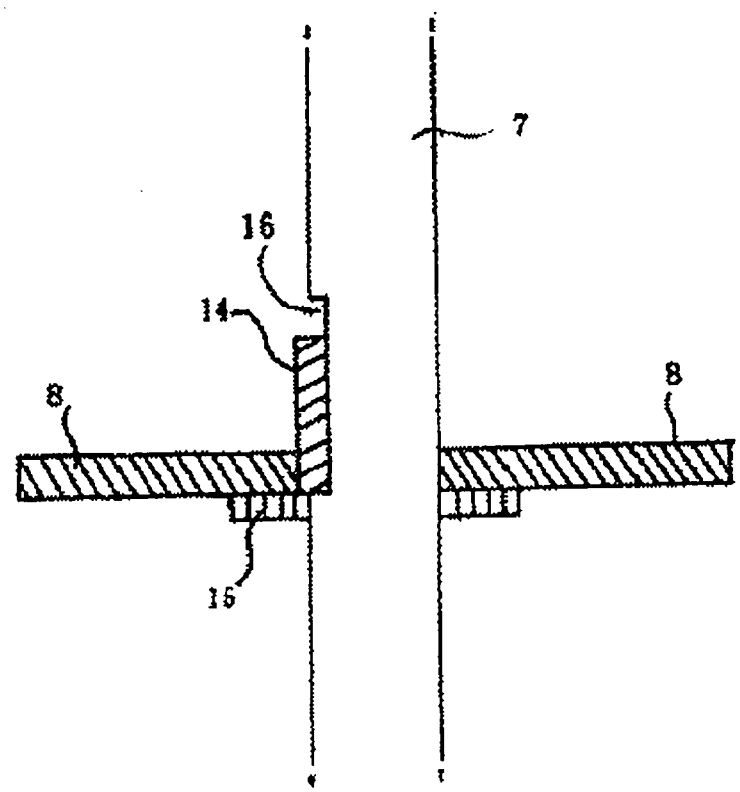
FIG. 5 is a cross-sectional view showing fasteners fastening a flywheel according to the present invention.
Figure 6:
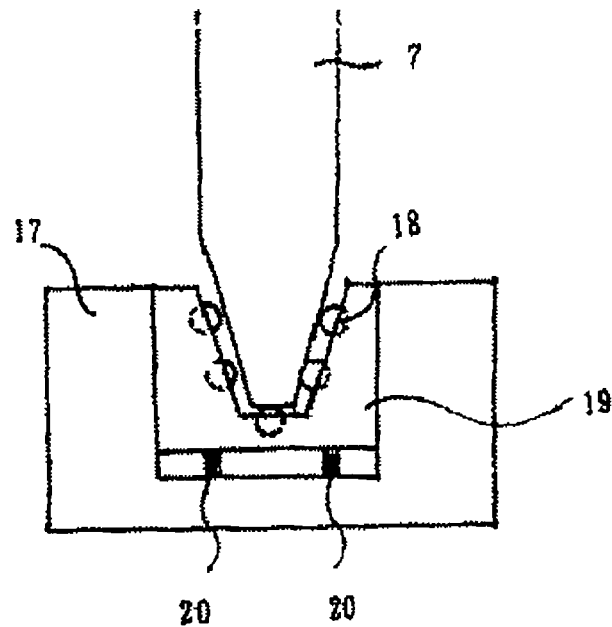
FIG. 6 is an explanatory view showing a mechanism for rotating a support column according to the present invention.

The flywheel 8 fixed to the support column 7 is a circular plate, and fixed to an approximately central portion of the support column 7 with upper and lower fasteners 14 and 15 as shown in FIG. 5. Here, the lower fastener 15 is a circular bearer fixed to the support column by welding, and the upper fastener 14 is one or more rectangle pines knocked and inserted into grooves 16 formed respectively in the support column 7 and the flywheel 8, to hold and fix the support column and the flywheel 8.

The lower end portions of the support column 7 are inserted into fixing member main bodies 17 with adjusters 20, the fixing member main bodies 17 provided respectively on upper and lower central portions of the inner surface of the circular ring 9. Moreover, each of the lower end portions of the support column 7 is inserted into the inner portion of a fixing member 19 formed in a substantially conical shape in the corresponding fixing member main body 17, the fixing member 19 including multiple bearings 18 aligned along the conical shape. With this structure, the rotation of the rotor unit 100 causes the support column 7 itself to rotate, and a rotation sensor (not shown) controls the rotation of the support column 7 to have a rated PRM of 700 to 2,000 in the event of rotation using the rotation sensor (not shown).

To attach the support column 7 detachably to the inside of the circular ring 9, the end portions of the support column 7 are inserted into the fixing member with the adjustors 20 including spring members provided inside the fixing member main bodies 17 to allow height adjustment, the fixing members each include the multiple bearings. The adjustors 20 include springs.

Near the lower end portion of the support column 7, a transmission mechanism is provided. As shown in FIG. 7, in this transmission mechanism, a rotating pulley 24 is directly attached to the support column 7 to transmit the torque of the support column 7 to the power generator 12 through a transmission belt 25. Alternatively, gear wheels which mesh with each other can be used as a transmission mechanism.

Moreover, a protrusion serving as a lighting conductor is provided near the upper end portion of the support column 7, while a ground wire is provided so as to extend from near the lower end portion of the support column 7 to the underground, to let energy occurring when lighting strikes flow into the underground. In addition, a circular ring with multiple strings or chains attached thereto (not shown) may be fitted to the protrusion serving as a lighting conductor to keep the support column 7 perpendicular.

In the present invention, a rotation motor (not shown) can be provided as a means used to cause the rotor to start rotating in a case with no winds.

A second wind turbine generator of the present invention includes a rotor unit 200, the circular ring 9 detachably holding the end portions of the support column, the power generator 12 generating power by using torque of the rotor unit 200, and the power storage 13 storing the power generated by the power generator 12. As shown in FIG. 9, the rotor unit 200 includes the support column 7, the multiple rotor blades 1 fixed to the support column 7 by the fasteners 21 attached to the support column 7, and a circular fixing member 22 holding and fixing the circumferences of the rotor blades same as those shown in FIG. 7.

In this example, as shown in FIG. 9, one end of each of the rotor blades 1 is fixed to the support column 7 by the multiple fasteners 21 attached to the support column 7 beforehand. Moreover, the circular fixing member 22 made of hard resin is attached to the circumference of the other end side of each of the rotor blades 1, and serves as a weight, which makes the rotation smooth.

Here, the circular fixing member 22 has recesses 23 made of hard resin and holding and fixing the outer frames of the rotor blades 1, in the inner circumferential surface. Thus, the outer circumferences of the rotor blades 1 are held and fixed by the recesses 23. In addition, on the outer circumference of the circular fixing member 22 made of hard resin, commercial messages may be shown by using LED chips or the like, or a picture or a pattern may be printed. Thus, messages, a picture, or a pattern shown on the outer circumference of the circular fixing member 22 can be visually identified easily even from a distance.

Means for operating the power generator 12 by using torque of the rotor is operated in the same manner as the first wind turbine generator of the present invention described above.

A wind turbine generator system which is a third invention of the present invention includes: frame units each consisting of the frame 2 in a semicircular shape, a semielliptical shape or a leaf shape, the multiple support frames 3 extending from the frame 2, and the central support frame 4 supporting the support frames 3; a rotor unit including the wind-power-generation rotor blades each consisting of the sail 5 attached to the frame unit so as to cover the frame unit; the circular ring 9 detachably holding the end portions of the support column; the power generator 12 generating power by using torque of the rotor unit; the power storage 13 storing the power generated by the power generator 12; and a power control unit 40 transmitting the power stored in the power storage 13 to a power system of a building. The rotor unit is either the rotor unit 100 including the support column 7, the flywheel 8 fixed to the central portion of the support column 7, and the multiple rotor blades 1 attached to the flywheel 8, or the rotor unit 200 including the support column 7, the multiple rotor blades 1 fixed by the fasteners 21 attached to the support column 7, and the circular fixing member 22 holding and fixing the outer circumferences of the rotor blades, and causes the support column to rotate. The power generator 12 generates power by rotating a rotor (not shown) of the power generator 12 linked to the support column 7 with the rotating pulley 24 interposed therebetween. The power generated by the power generator 12 is supplied to the power storage 13 through a rectifier (not shown), or directly from the power generator 12. Moreover, the power control unit 40 includes a power convertor (not shown) which converts the power from the power storage 13 to have a voltage, a frequency and the like conforming with the standards of the power system, and which has necessary protection functions.

Here, the power storage 13 is formed of a secondary battery or an electric double-layer capacitor, which makes it possible to do maintenance by requiring as less human work as possible.

A bottom portion of the circular ring 9 with the support column 7 and the rotor unit 100 provided therein is placed on and fixed to a mount 35. Alternatively, a fastener (not shown) which allows chains or strings to be fastened to the lighting conductor 34 provided on the upper portion of the circular ring 9 may also be provided to stabilize the circular ring 9 by pulling the circular ring 9 to the front, the back, the right and the left.

In this system of the present invention, the rotor with the rotor blades attached thereto rotates by receiving light winds (wind speed 1 to 2 m/s) blown from above, below, the right and the left. Here, a design may be made to include a small motor (not shown) for making the support column rotatable at startup of the case of forcing the rotor to rotate at startup by a man-induced operation.

In this system, a rotation sensor (not shown) is attached to the support column 7 or the rotor blades 1 to measure the torque of the rotor unit, and to cause the power generation function to operate when the rated speed reaches a set value from 700 rpm to 2,000 rpm.

In strong winds, the rotor unit is removed by a man-induced operation because the rotor can be detached easily, or, when the man-induced operation is not possible, fasteners may be separately provided in such positions that the fasteners can sandwich the support column, to force the rotation of the support column to stop rotating when the wind speed measured by the anemometer exceeds a predetermined wind speed value.

Figure 10:
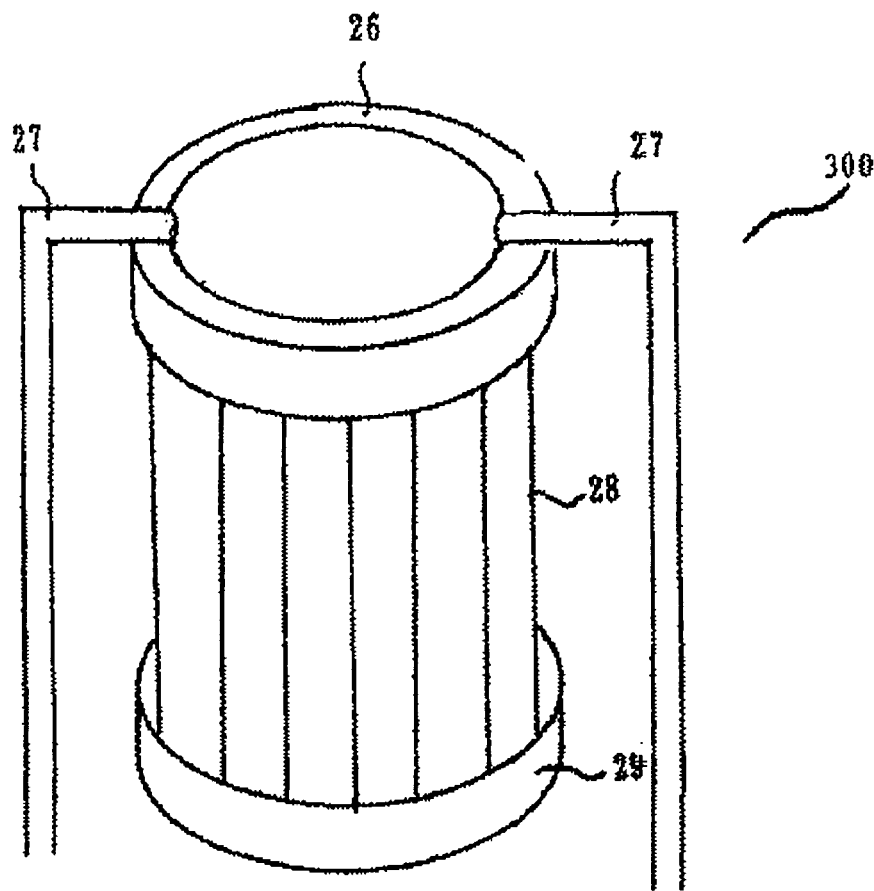
FIG. 10 is a perspective view of still another rotor according to the present invention.
Figure 11:
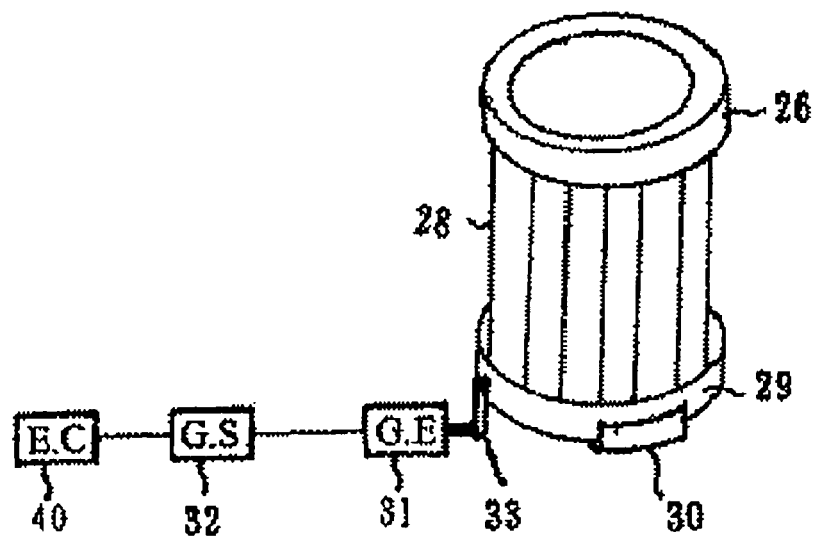
FIG. 11 is an explanatory view for explaining another wind turbine generator system according to the present invention.

A fourth wind power apparatus of the present invention includes, as shown in FIG. 10 and FIG. 11: a rotor unit 300 consisting of a circular suspension member 26 having an opening in the bottom, multiple support bars 27 supporting the suspension member, and a circular holder 29 holding one end portion of each of multiple rotor blades 28 suspended from the suspension member 26; a rotation stopper 30 forcing the rotor unit to stop rotating; a power generator 31 generating power by using torque of the circular holder; and a power storage 32 storing the power generated by the power generator.

Here, the circular suspension member 26 has an opening in the bottom, and the upper part of the opening is in a substantially circular shape. This allows the spherical rotor blades to rotate.

The power generator 31 is coupled with a pinion 32 for the power generator. Accordingly, when the power generation pinion 33 is rotated by the torque of the circular holder 29, a rotor (not shown) of the power generator 31 coupled with the pinion 33 is rotated, and power is generated by the action of a permanent magnet, for example. In this case, a commercially available alternating-current generator or direct-current generator may alternatively be used as the power generator.

The rotation stopper 30 is connected to an anemometer (not shown), and includes a pair of sandwiching members (not shown) capable of stopping the rotation by sandwiching the circular holder 29 from the right and the left in strong winds.

Another wind turbine generator system according to the present invention includes: the rotor unit 300 consisting of the circular suspension member 26 having an opening in the bottom, the multiple support bars 27 supporting the suspension member, and the circular holder 29 holding one end portion of each of the multiple rotor blades 28 suspended from the suspension member 27; the power generator 31 generating power by using torque of the circular holder 29; the power storage 32 storing the power generated by the power generator; and a power control unit 40 transmitting the power stored in the power storage 32 to a power system of a building. Here, the circular suspension member has an opening in the bottom, and the upper part of the opening is in a substantially circular shape, which allows the spherical rotor blades to rotate. The power generator is coupled with a pinion for the power generator. Accordingly, when the power generation pinion is rotated by the torque of the circular holder, a rotor of the power generator coupled with the pinion is rotated, and power is generated by the action of a permanent magnet, or by using a commercially available alternating-current generator or direct-current generator. The power generated by the power generator is supplied to the power storage through a rectifier, or directly from the power generator. Moreover, the power control unit includes a power convertor which converts the power from the power storage to have a voltage, a frequency and the like conforming with the standards of the power system, and which has necessary protection functions.

The frames and the support frames of the rotor blades used in the wind turbine generator of the present invention is preferably made of a metal or resin material having a certain degree of strength. Moreover, the sails attached to the frame units are preferably made of a strong cloth material used for marine sails or a strong cloth material used for parachutes for heavy drop.

Figure 12:
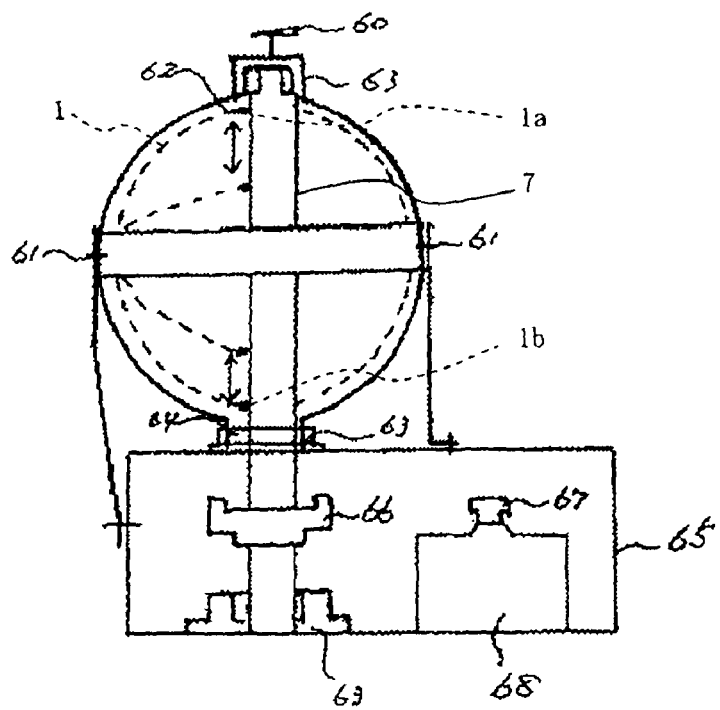
FIG. 12 is an explanatory view for explaining still another wind turbine generator system according to the present invention.
Figure 13:
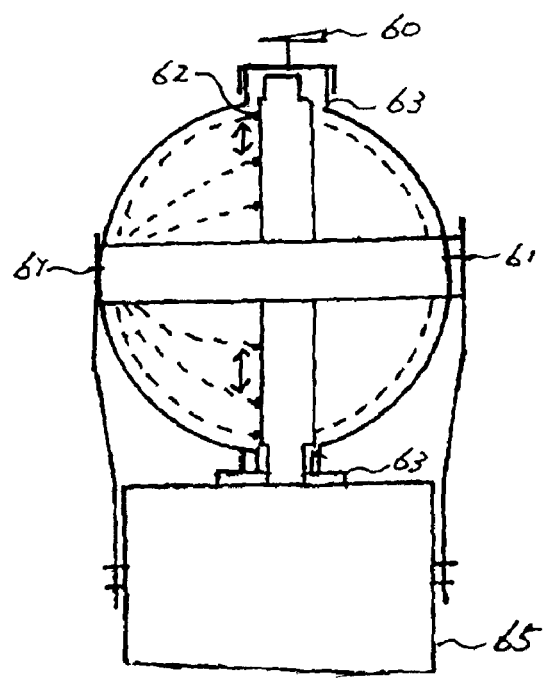
FIG. 13 is a side view of FIG. 12.

A fifth wind turbine generator of the present invention uses rotor blades having a structure that the sails of the rotor blades can be folded in strong winds, as shown in FIG. 12 and FIG. 13.

Here, the support column 7 serving as a rotation shaft in this example is provided with multiple longitudinal rails. Wires provided to end portions 1a and 1b of each of the rotor blades 1 (blades made of cloth) are moved by servomotors 61 provided on the outer surface of an outer frame fixing member, and the rotor blades 1 are thereby folded. For example, a sensor (not shown) causes the servomotors 61 to operate, on the basis of a value showing strong winds with a wind speed of 25 m or more measured by an anemometer 60. Thereby, wires 62 attached to the end portions 1a and 1b of each of the rotor blades move along the rails provided to the support column while folding the rotor blades from the end portions 1a and 1b.

In this example, the rotation shaft is held by three bearing housings 63 at the top, on top of a base, and at the bottom of the base. A shaft stopper ring 64 is attached so as to be in connection with the housing disposed on top of the base to stop the rotations of the outer frame and the rotation shaft in strong winds.

With this configuration, the rotor blades in the folded state do not rotate and let the strong winds pass. Accordingly, no maintenance due to strong winds is required; thus, this wind turbine generator is valuable when used in a region with few maintenance personnel.

When the wind speed value measured by the anemometer indicates 25 m or smaller, on the other hand, the shaft stopper ring 64 is released. Thereby, the rotor blades start to open by the action of the servomotors 61, and return to the original state.

Inside the base 65, a V-belt pulley 66 is disposed along the rotation shaft. The pulley 66 is configured to rotate, by using a belt (not shown), a small pulley 67 which is disposed so as to face the pulley 66 and which operates a power generator 68.

Here, multiple bearings (not shown) are buried into the inner circumference surfaces of the bearing housings so as to be in contact with the rotation shaft surface to facilitate the rotation of the rotation shaft.

The wind turbine generator of the present invention is a sectional wind turbine generator that can easily be constructed on the roof of a mid-rise/high-rise building as well as in a large site such as a green field with few plants or a desert. In addition, maintenance can be done easily because the rotor blades can be replaced individually.

In the case of constructing the wind turbine generator in a large site, a lighting conductor can be disposed in the center of the circular ring to let current occurring when lighting strikes flow into the underground. With this lighting conductor, damage to the rotor unit and the like can be prevented.

The rotor blades and the support column can be assembled at a height of approximately several meters above ground, when the rotor blades and the like are installed. Accordingly, a machine such as a large-size crane is not required in the event of a failure, unlike a conventional propeller wind turbine; hence, the wind turbine generator of the present invention can easily be constructed even in a place which a machine such as an automobile is difficult to enter.

While having a simple structure, the wind-power-generation rotor blades each have a circular or elliptic opening and a sail with a bowl-shaped radius. With such blades, even in light winds from any direction, above, below, the right or the left, the rotor unit can easily be rotated by receiving the winds by the entire blades. Moreover, once the rotor unit starts rotating, the support column serving as a support shaft continuously rotates at a rated speed from 700 rpm to 2,000 rpm by using the inertial force.

Moreover, commercial messages or pictures can be drawn on the rotor blades used in the present invention and the circular fixing member for holding and fixing the peripheries of the rotor blades, to enhance the advertising effects. Besides, various advertisements can be shown in accordance with the rotation speed.

Furthermore, the wind turbine generator system of the present invention can be remotely operated. Accordingly, this system is especially preferable for the operation in a place with few workers and the like.

When the wind speed measured by the anemometer is equal to or larger than a predetermined value, the wires are moved by the working of the power transmission motor and the canvas blades connected to the wires can thereby be folded frontward and backward. Thus, the rotor blades used in the wind turbine generator of the present invention has a structure that enables a folded state in strong winds to avoid receiving strong winds.

Priority is claimed to applications JP 2006-145911 filed Apr. 25, 2006, JP 2007-52025 filed Feb. 1, 2007 and PCT/JP2007/059417, and each of said foregoing applications is hereby explicitly incorporated by reference.

What is claimed is:

1. A wind turbine generator rotor unit, comprising:
   a support column being a rod having an upper end portion and a lower end portion each reduced in external diameter toward the tip of the end portion;
   a circular ring holding the end portions of the support column so that the support column itself rotates;
   a holder fixed to the support column; and
   a plurality of rotor blades attached to the support column by using the holder,
   the wind turbine generator rotor unit wherein the rotor blades each includes:
      a frame unit including a frame having an opening, a plurality of first support frames extending from the frame so as to form semielliptical shape, and a central support frame supporting the first support frames; and
      a sail attached to the frame unit so as to cover the frame unit.

2. The wind turbine generator rotor unit according to claim 1, wherein the holder is a circular plate fixed to a central portion of the support column, and the rotor blades are each attached to the holder by sandwiching the holder.

3. The wind turbine generator rotor unit according to claim 1, wherein the holder is a circular fixing member holding and fixing peripheries of the rotor blades.

4. The wind turbine generator rotor unit according to any one of claims 1 to 3, wherein fixing member main bodies are provided respectively on upper and lower central portions of an inner surface of the circular ring, and the end portions of the support column are fitted respectively to the insides of the fixing member main bodies by using adjustors which enable height adjustment.

5. The wind turbine generator rotor unit according to any one of claims 1 to 3, wherein the rotor blades have a structure making the rotor blades foldable frontward and backward.

6. A wind turbine generator comprising, at least:

the wind turbine generator rotor unit according to any one of claims 1 to 3;

a power generator generating power by using torque of the wind turbine generator rotor unit; and a transmission mechanism transmitting torque of the support column of the wind turbine generator rotor unit to the power generator.

7. The wind turbine generator according to claim 6, further comprising a power storage storing power generated by the power generator.

8. The wind turbine generator according to claim 7, wherein the power storage is formed of any one of a secondary battery and an electric double-layer capacitor.

9. The wind turbine generator according to claim 6, wherein the support column serving as a rotation shaft of the wind turbine generator rotor unit is provided with a plurality of longitudinal rails, and wires provided to end portions of each of the rotor blades are moved by a servomotor provided to one of the end portions of the support column, so that the rotor blades are folded.

10. A wind turbine generator system, comprising:

the wind turbine generator according to claims 6; and a power control unit transmitting power generated in the wind turbine generator to a power system of a building, the wind turbine generator system, wherein the wind turbine generator supplies power generated by the power generator to the power storage through a rectifier, or directly from the power generator, and the power control unit includes a power convertor which converts power from the power storage into power having a voltage, a frequency and the like conforming with power system standards, and which has necessary protection functions.

11. A wind turbine generator, comprising:

a rotor unit including a circular suspension member having an opening in the bottom, a plurality of rotor blades suspended from the suspension member, and a circular holder holding one end portion of each of the rotor blades;

a plurality of support rods supporting the suspension member;

a power generator generating power by using torque of the circular holder; and a power storage storing power generated by the power generator.

12. The wind turbine generator according to claim 11, further comprising a rotation stopper forcing the rotor unit to stop rotating.

13. A wind turbine generator system, comprising:

the wind turbine generator according to claim 11 or 12; and a power control unit transmitting power generated in the wind turbine generator to a power system of a building, the wind turbine generator system, wherein the wind turbine generator supplies power generated by the power generator to the power storage through a rectifier, or directly from the power generator, and the power control unit includes a power convertor which converts power from the power storage into power having a voltage, a frequency and the like conforming with power system standards, and which has necessary protection functions.

* * * * *